(12) United States Patent
Kamps et al.

(10) Patent No.: US 7,057,004 B2
(45) Date of Patent: Jun. 6, 2006

(54) PROCESS FOR THE PRODUCTION OF COPOLYCARBONATES WITH REDUCED COLOR

(75) Inventors: Jan Henk Kamps, Bergen op Zoom (NL); Jan Pleun Lens, Breda (NL)

(73) Assignee: General Electric Company, Schenectady, NY (US)

( * ) Notice: Subject to any disclaimer, the term of this patent is extended or adjusted under 35 U.S.C. 154(b) by 67 days.

(21) Appl. No.: 10/768,575

(22) Filed: Jan. 29, 2004

(65) Prior Publication Data
US 2005/0171322 A1  Aug. 4, 2005

(51) Int. Cl.
*C08G 64/00* (2006.01)

(52) U.S. Cl. .................. 528/196; 422/131; 422/135; 502/150; 502/208; 528/198

(58) Field of Classification Search ............... 422/131, 422/135; 502/150, 208; 528/196, 198
See application file for complete search history.

(56) References Cited

U.S. PATENT DOCUMENTS

| | | | |
|---|---|---|---|
| 4,323,668 A | 4/1982 | Brunelle | |
| 5,336,751 A | 8/1994 | Raymond, III | |
| 5,384,388 A | 1/1995 | Sakashita et al. | |
| 5,405,933 A | 4/1995 | Sakashita et al. | |
| 5,418,315 A | 5/1995 | Sakashita .................. | 528/196 |
| 5,418,317 A | 5/1995 | Raymond, III | |
| 5,420,192 A | 5/1995 | Ishiwa et al. | |
| 5,510,450 A | 4/1996 | Sakashita et al. | |
| 5,565,515 A | 10/1996 | Ishiwa et al. | |
| 5,602,201 A | 2/1997 | Fujiguchi et al. | |
| 5,606,009 A | 2/1997 | Sakashita .................. | 528/204 |
| 5,717,056 A | 2/1998 | Varadarajan et al. | |
| 6,399,739 B1 | 6/2002 | McCloskey et al. | |
| 6,420,512 B1 | 7/2002 | McCloskey et al. | |
| 6,420,588 B1 | 7/2002 | McCloskey et al. | |
| 6,469,192 B1 | 10/2002 | Burnell et al. | |
| 6,500,914 B1 | 12/2002 | Brack et al. | |
| 6,506,871 B1 | 1/2003 | Silvi et al. | |
| 6,518,391 B1 | 2/2003 | McCloskey et al. | |
| 2002/0123603 A1 | 9/2002 | Brack et al. | |
| 2002/0132957 A1 | 9/2002 | Brack et al. | |
| 2003/0149223 A1 | 8/2003 | McCloskey et al. | |
| 2004/0063825 A1* | 4/2004 | Nagai et al. ................ | 524/116 |

FOREIGN PATENT DOCUMENTS

| | | |
|---|---|---|
| EP | 0 508 774 B1 | 10/1992 |
| EP | 0 508 775 B1 | 10/1992 |
| EP | 0 663 425 B1 | 7/1995 |
| EP | 0 849 305 A2 | 6/1998 |
| EP | 0 849 305 A3 | 6/1998 |
| JP | 6136109 | 5/1994 |
| JP | 6136112 | 5/1994 |
| JP | 6136113 | 5/1994 |
| JP | 6136248 | 5/1994 |
| JP | 6136252 | 5/1994 |
| JP | 7102154 | 4/1995 |
| JP | 7102161 | 4/1995 |
| JP | 7102165 | 4/1995 |
| JP | 7188539 | 7/1995 |
| JP | 7196871 | 8/1995 |
| JP | 7196872 | 8/1995 |
| JP | 7196873 | 8/1995 |
| JP | 7196906 | 8/1995 |

* cited by examiner

*Primary Examiner*—Terressa Boykin
(74) *Attorney, Agent, or Firm*—Marina Larson & Associates, LLC

(57) ABSTRACT

A method is provided for reducing the color generated during production of copolycarbonate that includes quinone-type residues. The method includes the steps preparing a reaction mixture containing precursors of monomer residues, selecting a catalyst introduction strategy and adding catalysts according to the strategy. The strategy is sufficient to result in a product copolycarbonate with improved color. The method further includes the steps of introducing the reaction mixture to a series of process units and allowing the reaction mixture to polymerize thereby forming a copolycarbonate. The resulting copolycarbonate has improved color as compared to a copolycarbonate formed in a process without the steps of selecting a catalyst introduction strategy and introducing catalysts according to the selected strategy.

45 Claims, 1 Drawing Sheet

PROCESS FOR THE PRODUCTION OF COPOLYCARBONATES WITH REDUCED COLOR

BACKGROUND OF THE INVENTION

Polycarbonate is a thermoplastic that has excellent mechanical properties such as impact resistance, heat resistance and transparency. Polycarbonates are widely used in applications ranging from football helmets to automobile parts to transparent security windows. More recently, polycarbonates have also proven to be the material of choice for optical media applications such as optical discs, for example compact discs (CD) and digital versatile discs (DVD). Conventional polycarbonates are usually produced by (1) an interfacial polymerization, in which bisphenol A (BPA) is reacted directly with phosgene or (2) a melt polymerization process in which BPA is transesterified with a carbonic acid diester such as diphenyl carbonate (DPC). For many applications, there has been a need for materials possessing the fundamental characteristics of transparency and toughness inherent in BPA polycarbonate but possessing, in addition, certain improvements in physical properties relative those possessed by bisphenol A polycarbonate (BPA-PC), for example reduced birefringence for optical applications. For some applications improved chemical resistance relative to BPA polycarbonate is required, for example in certain medical and automotive applications. Copolycarbonates are materials frequently possessing the fundamental traits of BPA polycarbonate, transparency and toughness, but in certain instances also possessing improved performance characteristics for a given application relative to BPA polycarbonate.

One example of such a copolycarbonate comprises repeat units derived from resorcinol or hydroquinone in addition to repeat units derived from bisphenol A. The incorporation of resorcinol-derived and hydroquinone-derived repeat units into a BPA-polycarbonate confers excellent melt flow properties, molding properties, solvent and heat resistance, while maintaining the excellent mechanical properties and transparency inherent in bisphenol A polycarbonate. Such copolycarbonates can be prepared by interfacial polymerization, melt polymerization, or solid state polymerization. (U.S. Pat. No. 6,177,536). The present invention relates to an improved method to prepare these and related copolycarbonates using the melt polymerization method.

SUMMARY OF THE INVENTION

Applicants have determined that the formation of color in quinone-like copolycarbonates is affected by the point of addition of polymerization catalysts to the melt polymerization process. Thus, an embodiment of the present invention provides a method of producing a copolycarbonate with improved color wherein the method comprises the steps of, i. preparing a molten reaction mixture comprising a first dihydroxy aromatic compound comprising monomer residue (a), a second dihydroxy aromatic compound comprising monomer residue (b), and a carbonate source, wherein monomer residue (a) is a quinone structure, or a structure capable of forming a quinone structure upon oxidation, wherein monomer residue (b) is a quinone structure, or a structure capable of forming a quinone structure upon oxidation different from monomer residue (a) or is,

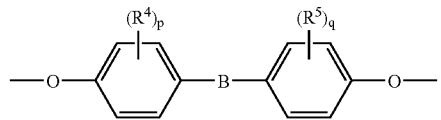

where B is

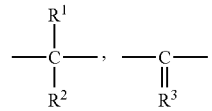

—O—, —CO—, —S—, —SO$_2$—, a C$_6$–C$_{20}$ aromatic radical, or a C$_6$–C$_{20}$ cycloaliphatic radical; the groups R$^1$ and R$^2$ are independently a hydrogen atom, C$_1$–C$_{20}$ alkyl radical, C$_4$–C$_{20}$ cycloalkyl radical, or C$_4$–C$_{20}$ aryl radical; or R$^1$ and R$^2$ together form a C$_4$–C$_{20}$ cycloaliphatic ring which is optionally substituted by one or more C$_1$–C$_{20}$ alkyl, C$_6$–C$_{20}$ aryl, C$_5$–C$_{21}$ aralkyl, C$_5$–C$_{20}$ cycloalkyl groups or a combination thereof, R$^3$ is a divalent hydrocarbylene group, and R$^4$ and R$^5$ are independently a hydrogen atom, halogen atom, nitro group, cyano group, C$_1$–C$_{20}$ alkyl radical C$_4$–C$_{20}$ cycloalkyl radical, or C$_6$–C$_{20}$ aryl radical and p and q are both integers from 0 to 4, ii. selecting a catalyst introduction strategy sufficient to result in a product copolycarbonate with improved color, wherein the catalyst introduction strategy is selected from the group consisting of, 1. introducing a polymerization catalyst to the molten reaction mixture after monomer residues (a), monomer residues (b), and carbonate source are melted and prior to substantial polymerization, 2. introducing a polymerization catalyst to the reaction mixture or monomer residues prior to melting with the proviso that residence time of the process from the start of melting until substantial polymerization has occurred is less than 4 hours, and 3. or a combination thereof, wherein the polymerization catalyst is an inorganic catalyst, an organic catalyst, or both inorganic and organic catalyst which may be introduced separately or together, iii. introducing the catalyst according to the selected catalyst introduction strategy, iv. introducing the reaction mixture to a series of process units, and v. allowing the reaction mixture to polymerize in the series of process units thereby forming copolycarbonate, wherein the copolycarbonate has improved color as compared to a copolycarbonate formed in a melt process without the steps of selecting a catalyst introduction strategy and introducing catalyst according to the selected strategy.

DETAILED DESCRIPTION OF THE INVENTION

Figure 1:
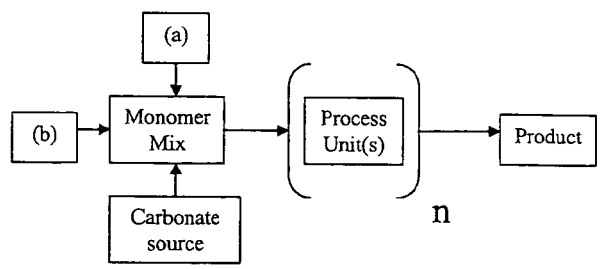
FIG. 1 is a schematic of an embodiment of a melt polymerization process of the current invention.

The present invention may be understood more readily by reference to the following detailed description of preferred embodiments of the invention and the examples included therein. The present invention provides a method for improving the color of a copolycarbonate produced by melt polymerization wherein the copolycarbonate comprises monomer residues of dihydroxy aromatic compounds and carbonates. The method comprises the steps of; preparing a reaction mixture comprising precursors of the monomer residues; selecting a catalyst introduction strategy sufficient to result in a product copolycarbonate with improved color; introducing a catalyst to the reaction mixture according to the selected catalyst introduction strategy; introducing the reaction mixture to a series of process units; and allowing the reaction mixture to polymerize thereby forming copolycarbonate, wherein the copolycarbonate has improved color as compared to a copolycarbonate formed in a melt process without the steps of selecting a catalyst introduction strategy and introducing catalyst according to the selected strategy.

In the specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

"Copolycarbonate" refers to polycarbonates incorporating repeat units derived from at least two dihydroxy aromatic compounds and includes copolyestercarbonates, for example a polycarbonate comprising repeat units derived from resorcinol, bisphenol A, and dodecandioic acid. Nothing in the description and claims of this application should be taken as limiting the copolycarbonate to only two dihydroxy aromatic residues unless the context is expressly limiting. Thus, the application encompasses copolycarbonates with residues of 2, 3, 4, or more types of dihydroxy aromatics.

"BPA" is herein defined as bisphenol A or 2,2-bis(4-hydroxyphenyl)propane.

"Substantial polymerization" is where the average molecular weight ($M_w$) of the copolycarbonate is less than 5,000 (PS standards).

"Melt polycarbonate" refers to a polycarbonate made by the transesterification of a diarylcarbonate with a dihydroxy aromatic compound.

"Catalyst system" as used herein refers to a catalyst or catalysts that catalyze the transesterification of a dihydroxy aromatic compound with a diarylcarbonate in the preparation of melt polycarbonate.

"Catalytically effective amount" refers to an amount of a catalyst at which catalytic performance is exhibited.

"Catalyst introduction strategy" refers to the method of adding the catalysts to the reaction mixture. The catalyst introduction strategy may include the introduction of catalysts to the reaction mixture as it is prepared or as the reaction mixture passes through a series of process equipment.

"Monomer mix tank" refers to the area of the process wherein the reaction mixture is prepared. The word tank does not limit the invention to the mixing of monomers within a single vessel. The mixing may occur in a series of tanks or by any other means to prepare a mixture.

"Process units" refers to the area within the system wherein the monomers react and where copolycarbonate weight is built. This may occur within, among other places, extruders, equilibration vessels, continuously stirred tank reactors, batch reactors, packed bed reactors or heat exchangers.

"Plaque Yellowness Index" refers to a measurement of color of a sample of copolycarbonate using a UV spectrophotometer converted to a 1 mm thick sample value. It is preferable that the copolycarbonate made by the method of the present invention have a plaque yellowness index value of between 0.4 and 8.0, more preferably between 0.04 and 5.0 and still more preferably between 0.04 and 3.0. The plaque YI of the resulting copolycarbonate is affected by the initial quality of the quinone type structure.

"Solution Yellowness Index" refers to the yellowness of the reaction mixture prior to substantial polymerization. Data can be measured with a UV/VIS spectrophotometer on a 10% Copolymer solution in $MECl_2$. The transmission can be measured on 3 wavelengths (445 nm, 555 nm, and 600 nm) against a $MeCl_2$ blank. With the following calculation the sol YI can be calculated; (Sol YI=(% T600−% T445)/% T555*100%).

"Dihydroxy aromatic compound(s)" means an aromatic compound which comprises two hydroxy groups on one or more aromatic rings, for example a bisphenol such as bisphenol A or a dihydroxy benzene such as resorcinol.

"Aromatic radical" refers to a radical having a valence of at least one comprising at least one aromatic group. Examples of aromatic radicals include phenyl, pyridyl, furanyl, thienyl, naphthyl, phenylene, and biphenyl. The term includes groups containing both aromatic and aliphatic components, for example a benzyl group.

"Cycloaliphatic radical" refers to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclopropyl, cyclopentyl cyclohexyl, tetrahydrofuranyl and the like.

Numerical values in the specification and claims of this application, particularly as they relate to polymer compositions, reflect average values for a composition that may contain individual polymers of different characteristics. Furthermore, the numerical values should be understood to include numerical values which are the same when reduced to the same number of significant figures and numerical values which differ from the stated value by less than the experimental error of the measurement technique used in the present application to determine the value.

The present invention provides a method for preparing a copolycarbonate. An embodiment of the method comprises contacting under melt polymerization conditions a first dihydroxy aromatic compound containing the precursor of monomer residue (a), and a second dihydroxy aromatic compound containing the precursor of monomer residue (b), with at least one carbonate source, and at least one melt polymerization catalyst.

The First Dihydroxy Aromatic Compound:

The first dihydroxy aromatic compound comprises monomer residue (a). It can be any quinone structure or structure capable of forming a quinone structure upon oxidation. Suitable types of these dihydroxy aromatic compounds may be selected from the group consisting of dihydroxy benzenes having structure III

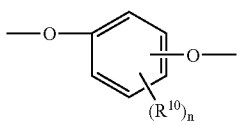

where each $R^{10}$ is independently at each occurrence a hydrogen atom, halogen atom, nitro group, cyano group, $C_1$–$C_{20}$ alkyl, $C_4$–$C_{20}$ cycloalkyl radical, $C_4$–$C_{20}$ aryl radical, and n is an integer from 0 to 4.

Non-limiting examples of dihydroxy benzenes having structure III are resorcinol; hydroquinone; 4-methylresorcinol; 5-methylresorcinol; 2-methylhydroquinone; 2-ethylhydroquinone; 2,5-dimethylhydroquinone; 2,6-dimethylhydroquinone; catechol; 3-methylcatechol; 4-methylcatechol; butylhydroquinone; and mixtures thereof.

The Second Dihydroxy Aromatic Compound:

The second dihydroxy aromatic compound forms the precursor of monomer residue (b) such that the polymer formed is a copolycarbonate. It can be any quinone structure or structure capable of forming a quinone structure upon oxidation different from monomer residue (a). Suitable types of these dihydroxy aromatic compounds again may be selected from the group consisting of dihydroxy benzenes having structure III

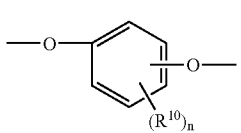

where each $R^{10}$ is independently at each occurrence a hydrogen atom, halogen atom, nitro group, cyano group, $C_1$–$C_{20}$ alkyl, $C_4$–$C_{20}$ cycloalkyl radical, $C_4$–$C_{20}$ aryl radical, and n is an integer from 0 to 4.

Non-limiting examples of dihydroxy benzenes having structure III are resorcinol; hydroquinone; 4-methylresorcinol; 5-methylresorcinol; 2-methylhydroquinone; 2-ethylhydroquinone; 2,5-dimethylhydroquinone; 2,6-dimethylhydroquinone; catechol; 3-methylcatechol; 4-methylcatechol; butylhydroquinone; and mixtures thereof.

Alternatively the second dihydroxy aromatic compound may be a bisphenol having structure IV

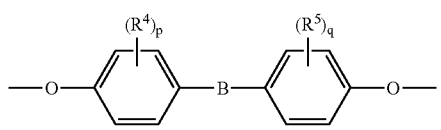

where B is,

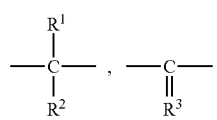

—O—, —CO—, —S—, —SO$_2$—, a $C_6$–$C_{20}$ aromatic radical, or a $C_6$–$C_{20}$ cycloaliphatic radical; the groups $R^1$ and $R^2$ are independently a hydrogen atom, $C_1$–$C_{20}$ alkyl radical, $C_4$–$C_{20}$ cycloalkyl radical, or $C_4$–$C_{20}$ aryl radical; or $R^1$ and $R^2$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$, aralkyl, $C_5$–$C_{20}$ cycloalkyl groups or a combination thereof, $R^3$ is a divalent hydrocarbylene group, and $R^4$ and $R^5$ are independently a hydrogen atom, halogen atom, nitro group, cyano group, $C_1$–$C_{20}$ alkyl radical $C_4$–$C_{20}$ cycloalkyl radical, or $C_6$–$C_{20}$ aryl radical and p and q are both integers from 0 to 4.

Bisphenols having structure IV are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)- 3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene; and 1,4-bis(2-(4-hydroxy-3-methylphenyl)-2-propyl)benzene. In many applications due to its relatively high reactivity, thermal stability, and low cost, bisphenol A (BPA) is frequently preferred.

The Carbonate Source:

In the production of copolymerized polycarbonates in accordance with the present invention, the compounds which react with the dihydroxy compounds to form carbonate linkages (the carbonate source) may be carbonate diesters, carbonyl halides, etc. Specific examples include: diphenyl carbonate, ditolyl carbonate, bis(chlorophenyl) carbonate, m-cresyl carbonate dinaphthyl carbonate, bis (diphenyl)carbonate, diethyl carbonate, dimethyl carbonate, dibutyl carbonate, dicyclohexyl carbonate, and other carbonate diesters, phosgene, and other carbonyl halides. Of the various compounds of this type, diphenyl carbonate is often preferred.

The carbonate can be also be derived from an activated dicarbonate or a mixture of an activated carbonate with diphenyl carbonate. A preferred activated carbonate of the present invention is an activated diarylcarbonate such as bismethylsalicylcarbonate (BMSC). However, as used herein the term "activated carbonate" is defined as a diarylcarbonate which is more reactive than diphenylcarbonate toward transesterification reactions. Such activated carbonates are of the general formula:

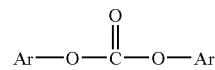

wherein Ar is a substituted aromatic radical having 6 to 30 carbon atoms. The preferred activated carbonates have the more specific general formula:

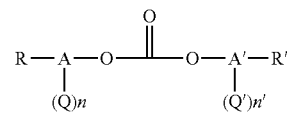

wherein Q and Q' are each independently activating groups. A and A' are each independently aromatic rings which can be the same or different depending on the number and location of their substituent groups, and n or n' are whole numbers of zero up to a maximum equivalent to the number of replaceable hydrogen groups substituted on the aromatic rings A and A', wherein a+a' is greater than or equal to 1. R and R' are each independently substituent groups such as alkyl, substituted alkyl, cycloalkyl, alkoxy, aryl, alkylaryl, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A minus the number n'. The number, type, and location of the R and R' substituents on the aromatic ring are not limited unless they deactivate the carbonate and lead to a carbonate which is less reactive than diphenylcarbonate.

Non-limiting examples of activating groups Q and Q' are: alkoxycarbonyl groups, halogens, nitro groups, amide groups, sulfone groups, sulfoxide groups, or imine groups with structures indicated below:

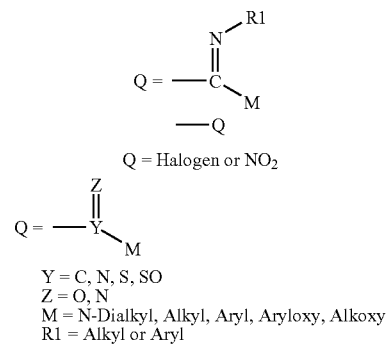

Q = Halogen or $NO_2$

Y = C, N, S, SO
Z = O, N
M = N-Dialkyl, Alkyl, Aryl, Aryloxy, Alkoxy
R1 = Alkyl or Aryl Specific and non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl) carbonate, bis(o-formylphenyl)carbonate. Unsymmetrical combinations of these structures, where the substitution number and type on A and A' are different, are also possible to employ in the current invention. A preferred structure for an activated carbonate is an ester-substituted diarylcarbonate having the structure:

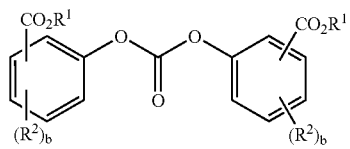

wherein $R^1$ is independently at each occurrence a $C_1$–$C_{20}$ alkyl radical, $C_4$–$C_{20}$ cycloalkyl radical, or $C_4$–$C_{20}$ aromatic radical; $R^2$ is independently at each occurrence a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, or $C_1$–$C_{20}$ acylamino radical; and b is independently at each occurrence an integer 0–4. At least one of the substituents $CO^2R^1$ is preferably attached in an ortho position relative to the carbonate group.

Examples of preferred ester-substituted diarylcarbonates include but are not limited to bis(methylsalicyl)carbonate (CAS Registry No. 82091-12-1), bis(ethyl salicyl)carbonate, bis(propyl salicyl) carbonate, bis(butylsalicyl) carbonate, bis(benzyl salicyl)carbonate, bis(methyl 4-chlorosalicyl)carbonate and the like. Typically bis(methylsalicyl)carbonate is preferred for use in melt polycarbonate synthesis due to its lower molecular weight and higher vapor pressure.

Some non-limiting examples of non-activating groups which, when present in an ortho position relative to the carbonate group, would not be expected to result in activated carbonates are alkyl, cycolakyl or cyano groups. Some specific and non-limiting examples of non-activated carbonates are bis(o-methylphenyl)carbonate, bis(p-cumylphenyl) carbonate, bis(p-(1,1,3,3-tetramethyl)butylphenyl)carbonate and bis(o-cyanophenyl)carbonate. Unsymmetrical combinations of these structures are also expected to result in non-activated carbonates.

Unsymmetrical diarylcarbonates wherein one aryl group is activated and one aryl is unactivated or de-activated would also be useful in this invention if the activating group renders the diaryl carbonate still more reactive than diphenyl carbonate.

The carbonate may also be derived from dicarboxylic acids, dicarboxylic acid esters, or dicarboxylic acid halides. Such constituent repeating units are typically polyester-polycarbonate units. Non-limiting examples of dicarboxylic acids include terephthalic acid, isophthalic acid, sebacic acid, decanedioic acid, dodecanedioic acid, etc. Non-limiting examples of dicarboxylic acid esters include diphenyl sebacate, diphenyl terephthalate, diphenyl isophthalate, diphenyl decanedioate, diphenyl dodecanedioate, etc. Non-limiting examples of dicarboxylic acid halides include terephthaloyl chloride, isophthaloyl chloride, sebacoyl chloride, decanedioyl chloride, dodecanedioyl chloride, etc. Such polyester-polycarbonate units may be present in proportions of up to 50 mole %, preferably not more than 30 mole %, in copolymerized polycarbonates in accordance with the present invention.

The Catalyst:

The method of the invention also comprises the step of introducing a catalyst to the reaction mixture to initiate a polymerization reaction. The catalyst may be introduced continuously, or may be introduced batchwise and may occur before, during or after the introduction of the precursors of monomer residues (a) or (b), or the carbonate.

The catalyst used in the method of the present invention is a base, and preferably comprises at least one source of alkaline earth ions or alkali metal ions, and/or at least one quaternary ammonium compound, a quaternary phosphonium compound or a mixture thereof. The source of alkaline earth ions or alkali metal ions being used in an amount such that the amount of alkaline earth or alkali metal ions present in the reaction mixture is in a range between about $10^{-5}$ and about $10^{-8}$ moles alkaline earth or alkali metal ion per mole of dihydroxy aromatic compound employed.

The quaternary ammonium compound is selected from the group of organic ammonium compounds having structure VI,

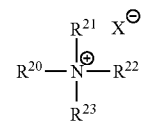

VI wherein $R^{20}$–$R^{23}$ are independently a $C_1C_{20}$ alkyl radical, $C_4$–$C_{20}$ cycloalkyl radical, or a $C_4$–$C_{20}$ aryl radical; and $X^-$ is an organic or inorganic anion. In one embodiment of the present invention anion $X^-$ is selected from the group consisting of hydroxide, halide, carboxylate, sulfonate, sulfate, formate, carbonate, and bicarbonate.

Non-limiting examples of suitable organic ammonium compounds comprising structure VI are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred.

The quaternary phosphonium compound is selected from the group of organic phosphonium compounds having structure VII,

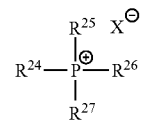

VII wherein $R^{24}$–$R^{27}$ are independently a $C^1$–$C^{20}$ alkyl radical, $C^4$–$C^{20}$ cycloalkyl radical, or a $C_4$–$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate. Suitable organic phosphonium compounds comprising structure VII are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred.

Where $X^-$ is a polyvalent anion such as carbonate or sulfate it is understood that the positive and negative charges in structures VI and VII are properly balanced. For example, where $R^{20}$–$R^{23}$ in structure VI are each methyl groups and $X^-$ is carbonate, it is understood that $X^-$ represents $½(CO_3^{-2})$.

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Other sources of alkaline earth and alkali metal ions include salts of carboxylic acids, such as sodium acetate and derivatives of ethylene diamine tetraacetic acid (EDTA) such as EDTA tetrasodium salt, and EDTA magnesium disodium salt. Sodium hydroxide is often preferred.

In order to achieve the formation of copolycarbonate using the method of the present invention an effective amount of catalyst must be employed. The amount of catalyst employed is typically based upon the total number of moles of first dihydroxy aromatic compound and second dihydroxy aromatic compound employed in the polymerization reaction. When referring to the ratio of catalyst, for example phosphonium salt VII, to all dihydroxy aromatic compounds employed in the polymerization reaction, it is convenient to refer to moles of phosphonium salt per mole of the first and second dihydroxy aromatic compounds combined, meaning the number of moles of phosphonium salt divided by the sum of the moles of each individual dihydroxy aromatic compound present in the reaction mixture. The amount of organic ammonium or phosphonium salts VI or VII employed typically will be in a range between about $1\times10^{-2}$ and about $1\times10^{-5}$, preferably between about $1\times10^{-3}$ and about $1\times10^{-4}$ moles per mole of the first and second dihydroxy aromatic compounds combined. The inorganic metal hydroxide catalyst typically will be used in an amount corresponding to between about $1\times10^{-4}$ and about $1\times10^{-8}$, preferably $1\times10^{-4}$ and about $1\times10^{-7}$ moles of metal hydroxide per mole of the first and second dihydroxy aromatic compounds combined.

The Melt Process:

The term "contacting under melt polymerization conditions" will be understood to mean those conditions necessary to effect reaction between the diarylcarbonate and the dihydroxy aromatic compounds employed according to the method of the present invention. The reaction temperature is typically in the range between 150° C. and 350° C., more preferably between 180° C. and 310° C. The pressure may be at atmospheric pressure, supra atmospheric pressure, or a range of pressures, for example from 2 atmospheres to 15 torr in the initial stages of the polymerization reaction, and at a reduced pressure at later stages, for example in a range between 15 torr and 0.1 torr. The reaction time is generally in a range between 0.1 hours and 10 hours, preferably between 0.1 and 5 hours.

FIG. 1 illustrates a melt process according to an embodiment of the present invention. The first stage of the process is to mix the first and second dihydroxy aromatic compounds, comprising the precursors of monomer residues (a) and (b), with the carbonate compound, thereby forming a reaction mixture. A catalyst is introduced to the reaction mixture according to the selected catalyst introduction strategy. The reaction mixture is fed to a series of process equipment wherein a copolymerization reaction takes place and molecular weight of the resulting copolycarbonate is increased.

In one embodiment of the present invention, at least one first dihydroxy aromatic compound comprising the precursor of monomer residue (a) and at least one second dihydroxy aromatic compound comprising the precursor of monomer residue (b) are employed in amounts such that the molar ratio of the first dihydroxy aromatic compound to the second dihydroxy aromatic compound is in a range between 0.01 and 99. Where the second dihydroxy aromatic compound comprises two or more compounds, for example a mixture of resorcinol and hydroquinone, and the first dihydroxy compound is a single compound, for example BPA, the molar ratio of the first dihydroxy aromatic compound to the second dihydroxy aromatic compound is expressed as the sum of the number of moles of resorcinol and hydroquinone used divided by the number of moles of BPA used. Similarly, where the second dihydroxy aromatic compound comprises but a single compound, for example resorcinol, and the first dihydroxy aromatic compound comprises a mixture of compounds, for example, BPA and BPZ (1,1-bis (4-hydroxyphenyl)cyclohexane), the molar ratio of the second dihydroxy aromatic compound to the first dihydroxy aromatic compound is expressed as the number of moles of resorcinol used divided by the sum of the number of moles of BPA and BPZ used. As mentioned, in one embodiment the molar ratio of the second dihydroxy aromatic compound to the first dihydroxy aromatic compound is in a range between 0.01 and 99. In an alternate embodiment the molar ratio of the second dihydroxy aromatic compound to the first dihydroxy aromatic compound is in a range between 0.05 and 0.7. A copolycarbonate prepared according to the method of the present invention using resorcinol as the second dihydroxy aromatic compound and BPA as the first dihydroxy aromatic compound in which the molar ratio of resorcinol to BPA was 0.7 could contain as much as 41 mole percent resorcinol derived repeat units if no loss occurred during the polymerization reaction.

Typically, the method of the present invention is carried out such that the amount of diarylcarbonate V employed corresponds to a molar ratio of diarylcarbonate V to all dihydroxy aromatic compounds, i.e. the first and/or second dihydroxy aromatic compounds, initially present in the reaction mixture, the molar ratio being in a range between 0.90 and 1.20, preferably between 1.01 and 1.10.

Catalyst Introduction Strategy

The method of the present invention calls for the steps of selecting a catalyst introduction strategy and introducing the catalysts to the reaction mixture in accordance with the selected strategy. As noted the catalyst introduction strategy incorporates the introduction of an organic catalyst and an inorganic catalyst.

FIG. 1 shows a melt polymerization processes of the type that may be employed with the current invention. Precursors of monomer residues (a) and (b), and a carbonate source are introduced to a monomer mix tank where they are mixed thereby forming a reaction mixture. The reaction mixture is then sent to a series of process units wherein polymerization reactions occur and copolymer weight increases. The polymerization catalysts are added to the reaction mixture per a selected strategy. The catalyst introduction strategies of the present invention include several potential introduction points of organic and/or inorganic catalysts.

The polymerization catalysts introduction may occur in at least three schemes. The first scheme is to introduce the polymerization catalysts to the reaction mixture after monomer (a), monomer (b) and the carbonate source have been melted and prior to substantial polymerization of the monomers. The second strategy is to introduce the polymerization catalysts to the reaction mixture or precursors of one or more of the monomer residues prior to melting with the proviso that residence time of the process from the start of melting until substantial polymerization has occurred is less than 4 hours. The third strategy is to combine the first two strategies wherein the organic catalyst is introduced to the reaction mixture prior to melting and the inorganic catalyst is introduced after melting. The purpose of selecting the strategy is so that the polymerization catalysts have minimal contact with the reaction mixture so as to prevent an undesirable oxidation reaction which produces an undesirable color formation within the resulting copolycarbonate.

Strategy 1:

The method of the present invention comprises the strategy of introducing the polymerization catalysts to the reaction mixture after monomer residues (a), monomer residues (b), and carbonate source are melted and prior to substantial polymerization. The organic and inorganic catalysts may be introduced to the reaction mixture either together or at separate points.

The introduction of the organic catalyst may occur in a monomer mix tank, or in a feed line to a first process unit. The organic catalyst may be introduced to the reaction mixture as it is prepared if melting is performed prior to combination of the components, and may be introduced with the monomer residues or the carbonate source either in the same feed lines or in a separate feed line.

The introduction of the inorganic catalyst typically occurs at the same time or after the introduction of the organic catalyst. If the introduction occurs at the same time, the catalysts may be introduced within the same feed or in separate feeds at any of the aforementioned points where the organic catalyst may be introduced. It is preferred, however, that the introduction of the catalyst solution to the molten reaction occur subsequent to the introduction of the precursor of monomer residue (a).

If the introduction of the inorganic catalyst occurs a different point than the introduction of the organic catalyst then the organic catalyst is desirably introduced to the molten reaction mixture prior to a first process unit while the inorganic catalyst is introduced to the molten reaction mixture at any one of various points prior to substantial polymerization of the molten reaction mixture. The inorganic catalyst may be introduced in the feed line from the monomer mix tank to a first process unit, or to the molten reaction mixture in the first process unit, or to the molten reaction mixture in a feed line to a second process unit, or to the molten reaction mixture in the second process unit, or to the molten reaction mixture in a feed line to a third process unit, or to the third process unit itself.

Strategy 2:

The method of the present invention comprises the strategy of introducing a polymerization catalyst to the reaction mixture prior to melting monomer residues (a), monomer residues (b), and carbonate source with the proviso that residence time of the process from the start of melting until substantial polymerization has occurred is less than 4 hours, more preferably 30 minutes or less, and most preferably 15 minutes or less.

The organic and inorganic catalysts may be introduced to the reaction mixture either together or at separate points. The inorganic and organic catalysts may be introduced to a monomer mix tank or a melter together with monomer residues (a), together with monomer residues (b), together with the carbonate source, in a separate feed or combinations thereof.

Strategy 3:

The method of the present invention comprises the strategy of introducing a polymerization catalyst to the reaction mixture wherein the organic catalyst is introduced to a monomer mix tank or a melter together with monomer residue (a), together with monomer residue (b), together with the carbonate source, in a separate feed or combinations thereof. The inorganic catalyst is then introduced to the molten reaction mixture, prior to substantial polymerization, within a monomer mix tank, a feed line from a monomer mix tank to a first process unit, the first process unit, a feed line to a second process unit, the second process unit, a feed line to a third process unit, the third process unit, or combinations thereof.

An embodiment of the present invention further comprises the step of introducing a dihydric phenol or other monomer to the molten reaction mixture within the series of process units through late monomer addition. This addition of dihydric phenol may occur with in the first, second, third or subsequent process units or the feed lines there between.

The method of the present invention may be employed to provide high molecular weight copolycarbonates. High molecular weight copolycarbonates are defined as copolycarbonates having a weight average molecular weight, $M_w$, greater than 15,000 (PS standards). The method of the present invention may also be employed to provide oligomeric copolycarbonates. Oligomeric copolycarbonates are defined as copolycarbonates as having weight average molecular weight, $M_w$, less than 15,000 (PS Standards).

The present invention also provides a method for making a molded article and a molded article formed from copolycarbonate with improved color prepared by the method comprising the steps of: preparing a molten reaction mixture comprising a first dihydroxy aromatic compound comprising monomer residue (a), a second dihydroxy aromatic compound comprising monomer residue (b), and a carbonate source; selecting a catalyst introduction strategy sufficient to result in a product copolycarbonate with improved color, wherein the catalyst introduction strategy is selected from the group consisting of, 1.) introducing a polymerization catalyst to the molten reaction mixture after 0 monomer residues (a), monomer residues (b), and carbonate source are melted and prior to substantial polymerization, 2.) introducing a polymerization catalyst to the reaction mixture or monomer residues prior to melting with the proviso that residence time of the process from the start of melting until substantial polymerization has occurred is less than 4 hours, and 3.) or a combination thereof, wherein the polymerization catalyst is an inorganic catalyst, an organic catalyst, or both inorganic and organic catalyst which may be introduced separately or together; introducing the catalyst according to the selected catalyst introduction strategy; introducing the reaction mixture to a series of process units; allowing the reaction mixture to polymerize in the series of process units thereby forming copolycarbonate, wherein the copolycarbonate has improved color as compared to a copolycarbonate formed in a melt process without the steps of selecting a catalyst introduction strategy and introducing catalyst according to the selected strategy; and forming a molded article from the copolycarbonate. The molded articles may be molded by inter alia the processes of injection molding, blow molding, extrusion or coextrusion.

Blends of copolymers are typical in industry. Thus the copolycarbonates prepared using the method of the present invention may be blended with other polymeric materials, for example, other polycarbonates, polyestercarbonates, polyesters and olefin polymers such as ABS. Further, the copolycarbonates prepared using the method of the present invention may be blended with conventional additives such as heat stabilizers, mold release agents, and UV stabilizers. These blends may be molded into various articles such as optical disks, optical lenses, automobile lamp components and the like. Thus, it is an aspect of the present invention to provide molded articles comprising the blends of copolycarbonate and/or the copolycarbonate produced by the method of the present invention.

EXAMPLES

Having described the invention in detail, the following examples are provided. The examples should not be considered as limiting the scope of the invention, but merely as illustrative and representative thereof. In the examples, the following measurements were made:

a.) Molecular weight: Mw and Mn were measured by GPC analysis of 1 mg/ml polymer solutions in methylene chloride versus polystyrene (PS) standards.

b.) Solution Yellowness Index data was measured with a UV/VIS spectophotometer on a 10% Copolymer solution in $MECl_2$. The transmission was measured on 3 wavelengths (445 nm, 555 nm, and 600 nm) against a $MeCl_2$ blank. With the following calculation the solution yellowness index (sol YI) was calculated;

$Sol\ YI = (\% T600 - \% T445)/\% T555 * 100\%$ c.) Small scale melt polymerization reactions were carried out with BPA and 16 mole % of resorcinol. In this case mole % is defined as 100*(mole co-monomer/(total moles bisphenol)). The total amount of DPC (moles) equaled 1.08*(BPA+co-monomer/(total moles bisphenol)). The amount of DPC was held constant at 25 g in each reaction. As catalysts, TMAH/(BPA+co-monomer)=$2.5 \times 10^{-4}$ (mole/mole) and NaOH/(BPA+co-monomer)=$1.5 \times 10^{-6}$ (mole/mole) were added as an aqueous solution (100 μl). Reactions were carried out by mixing bisphenols with DPC.

After nitrogen purging of the reactor system, polymerizations were carried out according to the following scheme:

TABLE 1

| Reaction scheme for small scale melt polymerizations. | | | |
|---|---|---|---|
| Reaction Stage | Time (min) | Temp (° C.) | P (mbar) |
| 1 | 480 | 180 | atm |
| 2 | 60 | 230 | 170.0 |
| 3 | 30 | 270 | 20.0 |
| 4 | 30 | 300 | 0.5–1.6 |

At the end of the reaction, the reactor was brought back to atmospheric pressure with a gentle nitrogen flow, and the polymer was harvested. The melting time of 480 minutes was chosen to simulate plant conditions.

Figure 2:
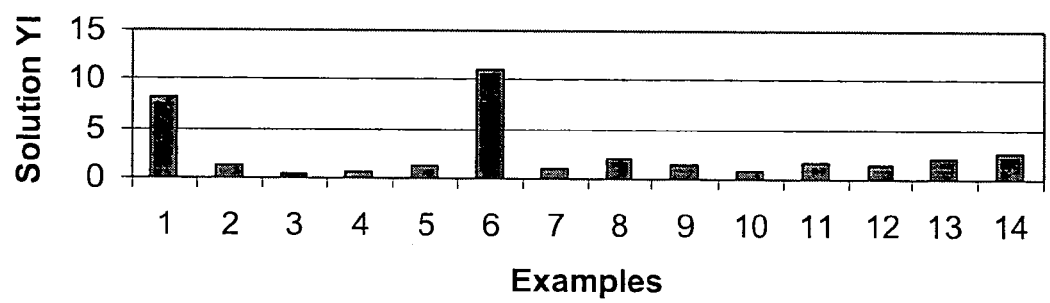
FIG. 2 is a bar graph that charts the comparative examples and invention examples from the examples section of the present application.

The results of all the examples below are presented in Table 2 and FIG. 2.

Comparative Examples

Example 1

In example 1, a batch reactor tube was charged under nitrogen with 19.73 g of BPA, 2.38 g of resorcinol, 25.00 g of DPC, and 100 (μl) of an aqueous solution of TMAH and NaOH ($2.5 \times 10^{-4}$ and $1.5 \times 10^{-6}$ moles catalyst/mole aromatic dihydroxy compound). Polymerization was carried out according to steps 1–4 of the scheme in Table 1. The polymer was sampled from the reaction tube.

Example 2

Example 7 was repeated except that the batch reactor tube was charged under nitrogen with 24.76 g of BPA, 25.00 g of DPC. After step 1 of the scheme in table 1 100 (μl) of an aqueous solutions of TMAH and NaOH ($2.5 \times 10^{-4}$ and $1.5 \times 10^{-4}$ moles catalyst/mole aromatic dihydroxy compound) was added. Polymerization was carried out according to steps 1–4 of the scheme in Table 1. The polymer was sampled from the reaction tube.

Example 3

Example 2 was repeated except that the batch reactor tube was charged under nitrogen with 24.76 g of BPA, 25.00 g of DPC. Before step 1 of the scheme in table 1 100 (μl) of an aqueous solutions of TMAH and NaOH ($2.5 \times 10^{-4}$ and $1.5 \times 10^{-6}$ moles catalyst/mole aromatic dihydroxy compound) was added. The time of step 1 was 15 minutes. Polymerization was carried out according to steps 2–4 of the scheme in Table 1. The polymer was sampled from the reaction tube.

Example 4

Example 3 was repeated except that the time of step 1 was 15 minutes. The catalyst was added after step 1 of scheme 1. Polymerization was carried out according to steps 2–4 of the scheme in Table 1. The polymer was sampled from the reaction tube.

Example 5

The specification for color of material produced on a commercial scale (OQ1050) at the melt polycarbonate plant. The yellowness index of the commercial materials is measured on a 1 mm thick sample using a UV spectrophotometer.

Example 6

Example 1 was repeated except that the resorcinol had a different initial quality. Polymerization was carried out according to steps 2–4 of the scheme in Table 1. The polymer was sampled from the reaction tube.

Invention Examples

Example 7

In example 7, a batch reactor tube was charged under nitrogen with 19.73 g of BPA 2.38 g of resorcinol, 25.00 g of DPC, after step 1 of the scheme in table 1 100 (μl) of an aqueous solutions of TMAH and NaOH ($2.5 \times 10^{-4}$ and $1.5 \times 10^{-4}$ moles catalyst/mole aromatic dihydroxy compound) was added. Polymerization was carried out according to steps 2–4 of the scheme in Table 1. The polymer was sampled from the reaction tube.

Example 8

In example 8, a batch reactor tube was charged under nitrogen with 19.73 g of BPA, 2.38 g of resorcinol, 25.00 g of DPC, and 50 (μl) of an aqueous solutions of TMAH and NaOH ($2.5 \times 10^{-4}$ and $1.5 \times 10^{-6}$ moles catalyst/mole aromatic dihydroxy compound). After step 1 of the scheme in table 1 50 (μl) of an aqueous solutions of TMAH and NaOH ($2.5 \times 10^{-4}$ and $1.5 \times 10^{-6}$ moles catalyst/mole aromatic dihydroxy compound) was added. Polymerization was carried out according to steps 2–4 of the scheme in Table 1. The polymer was sampled from the reaction tube.

Example 9

Example 1 was repeated except that the time of step 1 was 15 minutes. Polymerization was carried out according to steps 2–4 of the scheme in Table 1. The polymer was sampled from the reaction tube.

Example 10

Example 7 was repeated except that the time of step 1 was 15 minutes. Polymerization was carried out according to steps 2–4 of the scheme in Table 1. The polymer was sampled from the reaction tube.

Example 11

Example 7 was repeated except the catalyst solution was added prior to step 1 and that the time of step 1 was 2 hours. Polymerization was carried out according to steps 2–4 of the scheme in Table 1. The polymer was sampled from the reaction tube.

Example 12

Example 11 was repeated except that the time of step 1 was 4 hours. Polymerization was carried out according to steps 2–4 of the scheme in Table 1. The polymer was sampled from the reaction tube.

Example 13

Example 11 was repeated except that the resorcinol was obtained from a different initial quality. Polymerization was carried out according to steps 2–4 of the scheme in Table 1. The polymer was sampled from the reaction tube.

Example 14

Example 12 was repeated except that the resorcinol was obtained from a different initial quality. Polymerization was carried out according to steps 2–4 of the scheme in Table 1. The polymer was sampled from the reaction tube.

TABLE 2

Properties of the polymers of which the preparation is described in the examples above.

| Example # | Summary | YI |
|---|---|---|
| Comparative | | |
| 1 | BPA/Res-PC, 8 hr melting, cat before melting | 8.31 |
| 2 | BPA-PC cat. Added after melting | 1.16 |
| 3 | BPA-PC 15 minutes melting time, cat before melting | 0.44 |
| 4 | BPA-PC 15 minutes melting time, cat after melting | 0.66 |
| 5 | Commercial BPA-PC | 1.20 |
| 6 | BPA/Res-PC, 8 hr melting, cat before melting | 11.10 |

TABLE 2-continued

Properties of the polymers of which the preparation is described in the examples above.

| Example # | Summary | YI |
|---|---|---|
| Invention | | |
| 7 | BPA/Res-PC Cat added after melting | 1.00 |
| 8 | BPA/Res-PC TMAH before/NaOH after melting | 2.08 |
| 9 | BPA/Res-PC 15 minutes melt, cat before melting | 1.42 |
| 10 | BPA/Res-PC 15 minutes melt, cat after melting | 0.92 |
| 11 | BPA/Res-PC 2 hr melting time, cat before melting | 1.60 |
| 12 | BPA/Res-PC 4 hr melting time, cat before melting | 1.50 |
| 13 | BPA/Res-PC 2 hr melting time, cat before melting | 2.00 |
| 14 | BPA/Res-PC 4 hr melting time, cat before melting | 2.70 |

The invention claimed is:

1. A method of producing a copolycarbonate with improved color wherein the method comprises the steps of,
   i. preparing a molten reaction mixture comprising a first dihydroxy aromatic compound comprising monomer residue (a), a second dihydroxy aromatic compound comprising monomer residue (b), and a carbonate source,
   wherein monomer residue (a) is a quinone structure, or a structure capable of forming a quinone structure upon oxidation,
   wherein monomer residue (b) is a quinone structure, or a structure capable of forming a quinone structure upon oxidation different from monomer residue (a) or is,

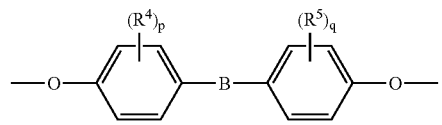

where B is

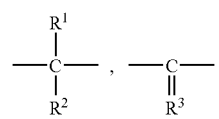

—O—, —CO—, —S—, —SO$_2$—, a C$_6$–C$_{20}$ aromatic radical, or a C$_6$–C$_{20}$ cycloaliphatic radical; the groups R$^1$ and R$^2$ are independently a hydrogen atom, C$_1$–C$_{20}$ alkyl radical, C$_4$–C$_{20}$ cycloalkyl radical, or C$_4$–C$_{20}$ aryl radical; or R$^1$ and R$^2$ together form a C$_4$–C$_{20}$ cycloaliphatic ring which is optionally substituted by one or more C$_1$–C$_{20}$ alkyl C$_6$–C$_{20}$ aryl, C$_5$–C$_{21}$ aralkyl, C$_5$–C$_{20}$ cycloalkyl groups or a combination thereof, R$^3$ is a divalent hydrocarbylene group, and R$^4$ and R$^5$ are independently a hydrogen atom, halogen atom, nitro group, cyano group, C$_1$–C$_{20}$ alkyl radical C$_4$–C$_{20}$ cycloalkyl radical, or C$_6$–C$_{20}$ aryl radical and p and q are both integers from 0 to 4, ii. selecting a catalyst introduction strategy sufficient to result in a product copolycarbonate with improved color, wherein the catalyst introduction strategy is selected from the group consisting of, 1. introducing a polymerization catalyst to the molten reaction mixture after monomer residues (a), monomer residues (b), and carbonate source are melted and prior to substantial polymerization,
2. introducing a polymerization catalyst to the reaction mixture or monomer residues prior to melting with the proviso that residence time of the process from the start of melting until substantial polymerization has occurred is less than 4 hours, and
3. or a combination thereof, wherein the polymerization catalyst is an inorganic catalyst, an organic catalyst, or both inorganic and organic catalyst which may be introduced separately or together, iii. introducing the catalyst according to the selected catalyst introduction strategy, iv. introducing the reaction mixture to a series of process units, and v. allowing the reaction mixture to polymerize in the series of process units thereby forming copolycarbonate, wherein the copolycarbonate has improved color as compared to a copolycarbonate formed in a melt process without the steps of selecting a catalyst introduction strategy and introducing catalyst according to the selected strategy.

2. The method of claim 1, wherein the polymerization catalyst comprises an organic and inorganic catalysts and is introduced to the reaction mixture after monomer residues (a), monomer residues (b), and carbonate source are melted and prior to substantial polymerization.

3. The method of claim 2, wherein the inorganic catalyst is NaOH and the organic catalyst is selected from the group consisting of TMAH, TBPA, and combinations thereof.

4. The method of claim 2, wherein monomer residue (a) has the structure,

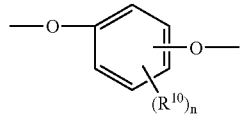

where each $R^{10}$ is independently at each occurrence a hydrogen atom, halogen atom, nitro group, cyano group, $C_1$–$C_{20}$ alkyl, $C_4$–$C_{20}$ cycloalkyl radical, $C_4$–$C_{20}$ aryl radical, and n is an integer from 0 to 4.

5. The method of claim 4, wherein monomer residue (a) is catechol, resorcinol, hydroquinone, butyl hydroquinone, methyl hydroquinone or any combination thereof.

6. The method of claim 2, wherein monomer residue (b) is BPA.

7. The method of claim 2, wherein the carbonate source is diphenyl carbonate.

8. The method of claim 2, wherein the carbonate source is an activated carbonate.

9. The method of claim 8, wherein the activated carbonate is bismethylsalicylcarbonate.

10. The method of claim 2, wherein up to 50 mole % of the carbonate source is selected from the group consisting of dicarboxylic acids, dicarboxylic acid esters, dicarboxylic acid halide or any combination thereof.

11. The method of claim 2, wherein the inorganic and organic catalysts are introduced together.

12. The method of claim 11, wherein the inorganic and organic catalysts are introduced with monomer residue (a), monomer residue (b), the carbonate source or combinations thereof.

13. The method of claim 11, wherein the inorganic and organic catalysts are introduced to the reaction mixture in a separate feed to a monomer mix tank, a first process unit, or a feed line to a first process unit.

14. The method of claim 2, wherein the inorganic and organic catalysts are introduced to the molten reaction mixture at separate points.

15. The method of claim 14, wherein the organic catalyst is introduced to the molten reaction mixture prior to a first process unit and the inorganic catalyst is introduced to the molten reaction mixture after the introduction of the organic catalyst and prior to substantial polymerization of the reaction mixture.

16. The method of claim 14, wherein the organic catalyst is introduced with monomer residue (a), monomer residue (b), the carbonate source or combinations thereof and the inorganic catalyst is introduced to the molten reaction mixture after the introduction of monomer (a).

17. The method of claim 14, wherein the inorganic catalyst is introduced to the molten reaction mixture in a feed line from a monomer mix tank to a first process unit, the first process unit, a feed line to a second process unit, the second process unit, a feed line to a third process unit, the third process unit, or combinations thereof.

18. The method of claim 2, wherein the method further comprises the step of introducing a dihydric phenol to the molten reaction mixture within the series of process units through late monomer addition.

19. The method of claim 1, wherein the polymerization catalyst comprises organic and inorganic catalysts and is introduced to the reaction mixture or monomer residues prior to melting with the proviso that residence time of the process from the start of melting until substantial polymerization has occurred is less than 4 hours.

20. The method of claim 19, wherein the residence time of the process from the start of melting until substantial polymerization has occurred is 30 minutes or less.

21. The method of claim 20, wherein the residence time of the process from the start of melting until substantial polymerization has occurred is 15 minutes or less minutes.

22. The method of claim 19, wherein the inorganic catalyst is NaOH and the organic catalyst is selected from the group consisting of TMAH, TBPA, and combinations thereof.

23. The method of claim 19, wherein monomer residue (a) has the structure,

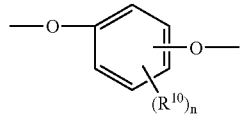

where each $R^{10}$ is independently at each occurrence a hydrogen atom, halogen atom, nitro group, cyano group, $C_1$–$C_{20}$ alkyl, $C_4$–$C_{20}$ cycloalkyl radical, $C_4$–$C_{20}$ aryl radical, and n is an integer from 0 to 4.

24. The method of claim 19, wherein monomer residue (a) is catechol, resorcinol, hydroquinone, butyl hydroquinone, methyl hydroquinone or any combination thereof.

25. The method of claim 19, wherein monomer residue (b) is BPA.

26. The method of claim 19, wherein the carbonate source is diphenyl carbonate.

27. The method of claim 19, wherein the carbonate source is an activated carbonate and is bismethylsalicylcarbonate.

28. The method of claim 19, wherein up to 50 mole % of the precursor of the carbonate source is derived from the group consisting of dicarboxylic acids, dicarboxylic acid esters, dicarboxylic acid halide or any combination thereof.

29. The method of claim 19, wherein the inorganic and organic catalysts are introduced together or separately.

30. The method of claim 19, wherein the inorganic and organic catalysts are introduced to a monomer mix tank or a melter together with monomer residue (a), together with monomer residue (b), together with the carbonate source, in a separate feed or combinations thereof.

31. The method of claim 1, wherein the polymerization catalyst comprises organic and inorganic catalysts,
wherein the organic catalyst is introduced to the reaction mixture or monomer residues prior to melting with the proviso that residence time of the process from the start of melting until substantial polymerization has occurred is less than 4 hours, and
wherein the inorganic catalyst is introduced to the reaction mixture after monomer residues (a), monomer residues (b), and carbonate source are melted, and wherein the introduction occurs prior to substantial polymerization.

32. The method of claim 31, wherein the residence time of the process from the start of melting until substantial polymerization has occurred is 30 minutes or less.

33. The method of claim 32, wherein the residence time of the process from the start of melting until substantial polymerization has occurred is 15 minutes or less.

34. The method of claim 31, wherein the inorganic catalyst is NaOH and the organic catalyst is selected from the group consisting of TMAH, TBPA, and combinations thereof.

35. The method of claim 31, wherein monomer residue (a) has the structure,

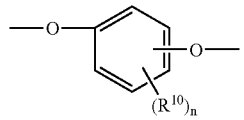

where each $R^{10}$ is independently at each occurrence a hydrogen atom, halogen atom, nitro group, cyano group, $C_1$–$C_{20}$ alkyl, $C_4$–$C_{20}$ cycloalkyl radical, $C_4$–$C_{20}$ aryl radical, and n is an integer from 0 to 4.

36. The method of claim 35, wherein monomer residue (a) is catechol, resorcinol, hydroquinone, butyl hydroquinone, methyl hydroquinone or any combination thereof.

37. The method of claim 31, wherein monomer residue (b) is BPA.

38. The method of claim 31, wherein the carbonate source is diphenyl carbonate.

39. The method of claim 31, wherein the carbonate source is an activated carbonate and is bismethylsalicylcarbonate.

40. The method of claim 31, wherein up to 50 mole % of the precursor of the carbonate source is derived from the group consisting of dicarboxylic acids, dicarboxylic acid esters, dicarboxylic acid halide or any combination thereof.

41. The method of claim 31, wherein the organic catalyst is introduced to a monomer mix tank or a melter together with monomer residue (a), together with monomer residue (b), together with the carbonate source, in a separate feed or combinations thereof, and
wherein the inorganic catalyst is introduced to the molten reaction mixture, within a monomer mix tank, a feed line from a monomer mix tank to a first process unit, the first process unit, a feed line to a second process unit, the second process unit, a feed line to a third process unit, the third process unit, or combinations thereof.

42. The method of claim 1, wherein the copolymer has a molecular weight Mw of at least 10,000 g/mole (Polystyrene standards) and the molecular weight Mw is subsequently increased to a value higher than 25,000 g/mole (Polystyrene standards) using a standard extrusion step.

43. The method of claim 1, wherein the copolymer has a molecular weight Mw of at least 10,000 g/mole (Polystyrene standards) and the molecular weight Mw is subsequently increased to a value higher than 25,000 g/mole (Polystyrene standards) by further reaction of oligomers by means of solid state polymerization.

44. A molded article formed from copolycarbonate with improved color prepared by the method comprising the steps of,
i. preparing a molten reaction mixture comprising a first dihydroxy aromatic compound comprising monomer residue (a), a second dihydroxy aromatic compound comprising monomer residue (b), and a carbonate source,
wherein monomer residue (a) is a quinone structure, or a structure capable of forming a quinone structure upon oxidation,
wherein monomer residue (b) is a quinone structure, or a structure capable of forming a quinone structure upon oxidation different from monomer residue (a) or is,

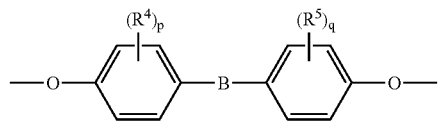

where B is

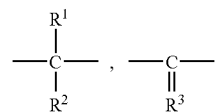

—O—, —CO—, —S—, —SO$_2$—, a $C_6$–$C_{20}$ aromatic radical, or a $C_6$–$C_{20}$ cycloaliphatic radical; the groups $R^1$ and $R^2$ are independently a hydrogen atom, $C_1$–$C_{20}$ alkyl radical, $C_4$–$C_{20}$ cycloalkyl radical, or $C_4$–$C_{20}$ aryl radical; or $R^1$ and $R^2$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof, $R^3$ is a divalent hydrocarbylene group, and $R^4$ and $R^5$ are independently a hydrogen atom, halogen atom, nitro group, cyano group, $C_1$–$C_{20}$ alkyl radical $C_4$–$C_{20}$ cycloalkyl radical, or $C_6$–$C_{20}$ aryl radical and p and q are both integers from 0 to 4, ii. selecting a catalyst introduction strategy sufficient to result in a product copolycarbonate with improved color, wherein the catalyst introduction strategy is selected from the group consisting of,
1. introducing a polymerization catalyst to the molten reaction mixture after monomer residues (a), monomer residues (b), and carbonate source are melted and prior to substantial polymerization,
2. introducing a polymerization catalyst to the reaction mixture or monomer residues prior to melting with the proviso that residence time of the process from the start of melting until substantial polymerization has occurred is less than 4 hours, and
3. or a combination thereof,
wherein the polymerization catalyst is an inorganic catalyst, an organic catalyst, or both inorganic and organic catalyst which may be introduced separately or together,
iii. introducing the catalyst according to the selected catalyst introduction strategy,
iv. introducing the reaction mixture to a series of process units,
v. allowing the reaction mixture to polymerize in the series of process units thereby forming copolycarbonate, wherein the copolycarbonate has improved color as compared to a copolycarbonate formed in a melt process without the steps of selecting a catalyst introduction strategy and introducing catalyst according to the selected strategy, and
vi. forming a molded article from the copolycarbonate.

45. A method for making a molded article formed from copolycarbonate with improved color prepared by the method comprising the steps of,
i. preparing a molten reaction mixture comprising a first dihydroxy aromatic compound comprising monomer residue (a), a second dihydroxy aromatic compound comprising monomer residue (b), and a carbonate source,
wherein monomer residue (a) is a quinone structure, or a structure capable of forming a quinone structure upon oxidation,
wherein monomer residue (b) is a quinone structure, or a structure capable of forming a quinone structure upon oxidation different from monomer residue (a) or is,

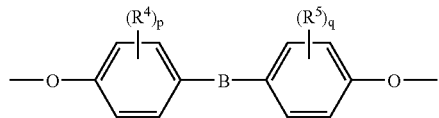

where B is

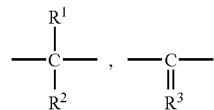

—O—, —CO—, —S—, —SO$_2$—, a C$_6$–C$_{20}$ aromatic radical, or a C$_6$–C$_{20}$ cycloaliphatic radical; the groups R$^1$ and R$^2$ are independently a hydrogen atom, C$_1$–C$_{20}$ alkyl radical, C$_4$–C$_{20}$ cycloalkyl radical, or C$_4$–C$_{20}$ aryl radical; or R$^1$ and R$^2$ together form a C$_4$–C$_{20}$ cycloaliphatic ring which is optionally substituted by one or more C$_1$–C$_{20}$ alkyl, C$_6$–C$_{20}$ aryl, C$_5$–C$_{21}$ aralkyl, C$_5$–C$_{20}$ cycloalkyl groups or a combination thereof, R$^3$ is a divalent hydrocarbylene group, and R$^4$ and R$^5$ are independently a hydrogen atom, halogen atom, nitro group, cyano group, C$_1$–C$_{20}$ alkyl radical C$_4$–C$_{20}$ cycloalkyl radical, or C$_6$–C$_{20}$ aryl radical and p and q are both integers from 0 to 4,
ii. selecting a catalyst introduction strategy sufficient to result in a product copolycarbonate with improved color, wherein the catalyst introduction strategy is selected from the group consisting of,
1. introducing a polymerization catalyst to the molten reaction mixture after monomer residues (a), monomer residues (b), and carbonate source are melted and prior to substantial polymerization,
2. introducing a polymerization catalyst to the reaction mixture or monomer residues prior to melting with the proviso that residence time of the process from the start of melting until substantial polymerization has occurred is less than 4 hours, and
3. or a combination thereof,
wherein the polymerization catalyst is an inorganic catalyst, an organic catalyst, or both inorganic and organic catalyst which may be introduced separately or together,
iii. introducing the catalyst according to the selected catalyst introduction strategy,
iv. introducing the reaction mixture to a series of process units,
v. allowing the reaction mixture to polymerize in the series of process units thereby forming copolycarbonate, wherein the copolycarbonate has improved color as compared to a copolycarbonate formed in a melt process without the steps of selecting a catalyst introduction strategy and introducing catalyst according to the selected strategy, and
vi. forming a molded article from the copolycarbonate.

* * * * *